(12) United States Patent
Sangoi et al.

(10) Patent No.: US 10,593,005 B2
(45) Date of Patent: Mar. 17, 2020

(54) DYNAMIC FORECASTING FOR FORWARD RESERVATION OF CAB

(71) Applicant: Meru Cab Company Private Limited, Mumbai, Maharashtra (IN)

(72) Inventors: Nilesh Sangoi, Mumbai (IN); Manohar Reddy, Mumbai (IN); Suryaganesh Sastry, Mumbai (IN)

(73) Assignee: Meru Cab Company Private Limited, Mumbai (IN)

( * ) Notice: Subject to any disclaimer, the term of this patent is extended or adjusted under 35 U.S.C. 154(b) by 386 days.

(21) Appl. No.: 15/508,400

(22) PCT Filed: Mar. 11, 2015

(86) PCT No.: PCT/IN2015/000121
§ 371 (c)(1),
(2) Date: Mar. 2, 2017

(87) PCT Pub. No.: WO2016/035091
PCT Pub. Date: Mar. 10, 2016

(65) Prior Publication Data
US 2017/0301054 A1 Oct. 19, 2017

(30) Foreign Application Priority Data
Sep. 3, 2014 (IN) .......................... 2806/MUM/2014

(51) Int. Cl.
*G06Q 50/30* (2012.01)
*H04W 4/029* (2018.01)
(Continued)

(52) U.S. Cl.
CPC ............. *G06Q 50/30* (2013.01); *G06Q 10/02* (2013.01); *G06Q 30/08* (2013.01); *G08G 1/202* (2013.01); *H04W 4/029* (2018.02)

(58) Field of Classification Search
CPC ........ G06Q 50/30; G06Q 30/08; G06Q 10/02; H04W 4/029; G08G 1/202
See application file for complete search history.

(56) References Cited

U.S. PATENT DOCUMENTS 5,922,040 A * 7/1999 Prabhakaran .......... G08G 1/127
340/990
6,356,838 B1 * 3/2002 Paul ................... G01C 21/3453
701/410

(Continued)

OTHER PUBLICATIONS

International Search Report dated Sep. 11, 2015 (Sep. 11, 2015) in corresponding International Patent Application No. PCT/IN2015/000121.

*Primary Examiner* — Ashford S Hayles
(74) *Attorney, Agent, or Firm* — Pepper Hamilton LLP

(57) ABSTRACT

Disclosed is a method for forward reservation of a cab. The method comprises receiving a first data set from a portable device, wherein the first data comprises a pick up location, a drop location, a scheduled time and a scheduled date. Further, mapping the first data set with a second data set, wherein the second data set is based on a predicated data and a current data. The method further comprises transmitting a third data set to the portable device. The method comprises receiving a confirmation message for the forward reservation from the portable device. Further, initiating a bid process for the forward reservation at a pre-defined interval before the scheduled time. Further, the method comprises capturing a plurality of bids received and selecting a winning. Further, assigning the forward reservation for the cab to either the winning bid or to a cab borrowed from one or more of neighbouring zone and transmitting a first set of information to the portable device.

12 Claims, 5 Drawing Sheets

Demand flow as a function of time

(51) Int. Cl.
  *G06Q 10/02* (2012.01)
  *G08G 1/00* (2006.01)
  *G06Q 30/08* (2012.01)

(56) References Cited

U.S. PATENT DOCUMENTS

| | | | | |
|---|---|---|---|---|
| 6,756,913 | B1* | 6/2004 | Ayed | G06Q 10/02 |
| 8,315,910 | B2* | 11/2012 | Goino | G06Q 30/0601 |
| | | | | 705/26.1 |
| 8,630,897 | B1* | 1/2014 | Prada Gomez | G06Q 30/02 |
| | | | | 705/14.11 |
| 9,002,640 | B2* | 4/2015 | Beaurepaire | G06Q 10/00 |
| | | | | 701/400 |
| 9,269,103 | B1* | 2/2016 | Kumar | G06Q 30/0605 |
| 9,488,484 | B2* | 11/2016 | Lord | G01C 21/34 |
| 9,934,530 | B1* | 4/2018 | Iacono | G06Q 30/0637 |
| 9,960,986 | B2* | 5/2018 | Tao | H04L 41/5051 |
| 2002/0019760 | A1* | 2/2002 | Murakami | G06Q 10/047 |
| | | | | 705/7.25 |
| 2002/0052751 | A1* | 5/2002 | Ebata | G06Q 10/08355 |
| | | | | 705/417 |
| 2003/0040944 | A1* | 2/2003 | Hileman | G06Q 10/02 |
| | | | | 705/5 |
| 2003/0054837 | A1 | 3/2003 | Ennis | |
| 2004/0030572 | A1* | 2/2004 | Campbell | G01C 21/26 |
| | | | | 705/333 |
| 2004/0177109 | A1* | 9/2004 | Lee | G08G 1/202 |
| | | | | 709/201 |
| 2005/0143095 | A1* | 6/2005 | Jacob | G06Q 20/32 |
| | | | | 455/456.3 |
| 2005/0240927 | A1* | 10/2005 | Hintermeister | G06Q 10/10 |
| | | | | 718/100 |
| 2006/0034201 | A1* | 2/2006 | Umeda | G06Q 30/02 |
| | | | | 370/310 |
| 2006/0059023 | A1* | 3/2006 | Mashinsky | G06Q 10/02 |
| | | | | 705/5 |
| 2006/0106675 | A1* | 5/2006 | Cohen | G06Q 10/06 |
| | | | | 705/26.1 |
| 2007/0073552 | A1 | 3/2007 | Hileman | |
| 2008/0015923 | A1* | 1/2008 | Masaba | G06Q 10/06311 |
| | | | | 705/7.13 |
| 2008/0114629 | A1* | 5/2008 | Pavlov | G06Q 10/08 |
| | | | | 705/347 |
| 2008/0147450 | A1* | 6/2008 | Mortimore | G06Q 10/02 |
| | | | | 705/5 |
| 2008/0174485 | A1* | 7/2008 | Carani | G06Q 10/08 |
| | | | | 342/357.46 |
| 2008/0189148 | A1* | 8/2008 | Diaz | G06Q 10/02 |
| | | | | 705/6 |
| 2008/0189207 | A1* | 8/2008 | Wurster | G06Q 10/02 |
| | | | | 705/40 |
| 2008/0195428 | A1* | 8/2008 | O'Sullivan | G08G 1/123 |
| | | | | 705/6 |
| 2009/0192851 | A1* | 7/2009 | Bishop | G06Q 10/08 |
| | | | | 705/26.3 |
| 2009/0313077 | A1* | 12/2009 | Wheeler, IV | G01C 21/26 |
| | | | | 705/7.14 |
| 2010/0121739 | A1* | 5/2010 | McCarthy | G06Q 30/00 |
| | | | | 705/26.1 |
| 2010/0185486 | A1 | 7/2010 | Barker et al. | |
| 2011/0099040 | A1* | 4/2011 | Felt | G06Q 10/0631 |
| | | | | 705/7.12 |
| 2011/0137699 | A1* | 6/2011 | Ben-Ari | G06Q 10/00 |
| | | | | 705/7.13 |
| 2012/0036028 | A1* | 2/2012 | Webb | G06Q 30/06 |
| | | | | 705/15 |
| 2012/0041675 | A1* | 2/2012 | Juliver | G06Q 10/08 |
| | | | | 701/465 |
| 2012/0078671 | A1* | 3/2012 | Mohebbi | G06Q 10/0631 |
| | | | | 705/7.12 |
| 2012/0131170 | A1* | 5/2012 | Spat | H04L 67/20 |
| | | | | 709/223 |
| 2012/0232943 | A1* | 9/2012 | Myr | G06Q 10/04 |
| | | | | 705/7.13 |
| 2013/0073327 | A1* | 3/2013 | Edelberg | G06Q 10/047 |
| | | | | 705/7.13 |
| 2013/0110385 | A1* | 5/2013 | Heed | G06Q 10/047 |
| | | | | 701/117 |
| 2013/0132246 | A1* | 5/2013 | Amin | G06Q 40/10 |
| | | | | 705/34 |
| 2013/0144831 | A1* | 6/2013 | Atlas | G06N 5/02 |
| | | | | 706/50 |
| 2013/0158846 | A1* | 6/2013 | Zhang | G08G 1/123 |
| | | | | 701/117 |
| 2013/0290043 | A1* | 10/2013 | Hoque | G06Q 10/02 |
| | | | | 705/5 |
| 2014/0011522 | A1* | 1/2014 | Lin | H04W 4/023 |
| | | | | 455/456.2 |
| 2014/0051465 | A1* | 2/2014 | Ruys | G08G 1/202 |
| | | | | 455/457 |
| 2014/0067490 | A1* | 3/2014 | James | G06Q 30/02 |
| | | | | 705/13 |
| 2014/0188650 | A1* | 7/2014 | Sun | G06Q 30/0605 |
| | | | | 705/26.2 |
| 2014/0229258 | A1* | 8/2014 | Seriani | G06Q 30/08 |
| | | | | 705/14.23 |
| 2014/0278634 | A1* | 9/2014 | Horvitz | G06Q 10/063112 |
| | | | | 705/7.14 |
| 2014/0279596 | A1* | 9/2014 | Waris | G06Q 10/083 |
| | | | | 705/317 |
| 2015/0081362 | A1* | 3/2015 | Chadwick | G06Q 10/06311 |
| | | | | 705/7.14 |
| 2015/0142518 | A1* | 5/2015 | Farinha Gomes Felix | |
| | | | | G06Q 30/0202 |
| | | | | 705/7.31 |
| 2015/0206093 | A1* | 7/2015 | Trew | G06Q 10/083 |
| | | | | 705/337 |
| 2015/0242944 | A1* | 8/2015 | Willard | G06Q 30/0645 |
| | | | | 705/5 |
| 2015/0323333 | A1* | 11/2015 | Lord | G01C 21/34 |
| | | | | 701/117 |
| 2015/0325128 | A1* | 11/2015 | Lord | G08G 1/20 |
| | | | | 705/13 |
| 2015/0339923 | A1* | 11/2015 | Konig | G08G 1/202 |
| | | | | 701/522 |
| 2016/0019728 | A1* | 1/2016 | Petrie | G06Q 30/0284 |
| | | | | 705/5 |
| 2016/0048777 | A1* | 2/2016 | Kitagawa | G06Q 10/025 |
| | | | | 705/6 |
| 2016/0048804 | A1* | 2/2016 | Paul | G06Q 10/08355 |
| | | | | 705/338 |
| 2016/0196629 | A1* | 7/2016 | Sheha | G01C 21/26 |
| | | | | 705/13 |
| 2016/0231129 | A1* | 8/2016 | Erez | G01C 21/3423 |
| 2016/0328669 | A1* | 11/2016 | Droege | G06Q 10/06311 |
| 2017/0131112 | A1* | 5/2017 | Ogawa | G06Q 50/30 |
| 2017/0228683 | A1* | 8/2017 | Hu | G06Q 10/063112 |
| 2018/0025407 | A1* | 1/2018 | Zhang | G06Q 10/02 |
| | | | | 705/26.81 |
| 2018/0240045 | A1* | 8/2018 | Zhang | G06Q 10/047 |

* cited by examiner

Demand flow as a function of time

Borrowing Zones

DYNAMIC FORECASTING FOR FORWARD RESERVATION OF CAB

CROSS REFERENCE TO RELATED APPLICATIONS

This application is a national phase filing under 35 U.S.C. § 371 of International Patent Application No. PCT/IN2015/000121, filed Mar. 11, 2015, which claims the benefit of Indian Patent Application No. 2806/MUM/2014, filed Sep. 3, 2014, each of which is incorporated herein by reference in its entirety.

FIELD OF INVENTION

The present disclosure relates generally to cab availability, more specifically to dynamic forecasting and real time display of cab availability for forward reservation.

BACKGROUND

Forecasting techniques are very crucial in management of private transportation vehicles in metropolis where supply largely mismatches the demand at peak hours. Taxi or Cab operators struggle to optimize their service by reducing concentration of umpteen unused cabs at and around one area and evenly dispersing them to pull in more bookings. Looking through a customer's lens it points towards a more fundamental problem that the cab operators usually provide service only on real-time basis. This problem restricts customer from booking a ride beforehand and also cab operators to predict availability of a cab on a future date and time from getting a prospective client.

Existing prior art enables a prospective customer to call/text/email an operator with his location, destination & time. The operator in turn confirms it by receiving acceptance from one or more available drivers in vicinity for a particular time slot on the same day.

US patent US 2011/0099040 A1, titled "A mobile taxi dispatch system" describes/discloses a system which receives a request for a taxi/cab from a user. The system, then, selects one or more taxi drivers available and accepts their confirmation. It selects one or more taxi from those which accepted the request.

The whole selection process is based on certain measures. It sends confirmation details to the user and the selected taxi.

US patent US 2010/0185486 A1, titled "Determining the demand associated with origin-destination pairs for bus ridership forecasting" describes a method to determine the demand for a pair of stops, termed as origin-destination pairs. A count data of passengers getting on and off at each stop is received by the computer system. It also includes the operation of a translation module to deduce the demand based on the counts at each stop.

US patent US 2013/0144831 A1, titled "Predicting Taxi Utilization Information" discloses a system in which techniques are described for automatically analyzing possible events in information predicting taxi demand. It generates a representative taxi demand in future. The contingent demand information is generated for, like projecting expected likelihood of finding a passenger at certain place or time. The representative contingent taxi demand information is generated through historical demand data collected through data sensors in or near roads or through publicly available data sets.

However, the methods discussed above for optimization of taxi/cab services do not utilize historical data to analyse load balancing with a mechanism to display the same in real-time for forward reservation of cab as well as 'borrowing' from vicinity in case of exigency.

OBJECT OF THE INVENTION

1. It is the primary object of the disclosure to disclose a dynamic forecasting method for forecasting of future demands subject to time, day and city and particular zone in the city.
2. It is another objective of the present disclosure to enable a customer booking device to display in real time the availability information of cab for a future (near or extended) date.
3. It is another objective of the present disclosure to optimize the functionality of whole cab system by proper utilization of the resources which also includes the concept of 'borrowing' from neighbouring zones.
4. It is another objective of this disclosure to devise a prediction/forecast system which bases its outcome on past/historical data and load balancing.
5. It is another objective of the present disclosure to devise a bidding mechanism which can select an available cab driver in the proximity of prospective customer based upon pre-defined parameters.

SUMMARY

One of the embodiments of the present disclosure discloses a system and method enabling forecasting of future cab demand through analysis of historical data set and parameters based on time division and zone division slots as well as proper utilization of cabs by the method of 'borrowing' from neighbouring zones. Further, displaying cab availability in real time for particular area at particular time slot, for a particular day in future based on prediction and real time decision systems. The present disclosure further enables confirmation of a booking to a willing cab driver, wherein the cab driver is selected based on a bidding process. The present disclosure enables a prospective client to monitor, search, book and confirm a cab service.

DETAILED DESCRIPTION OF THE INVENTION

Figure 1:
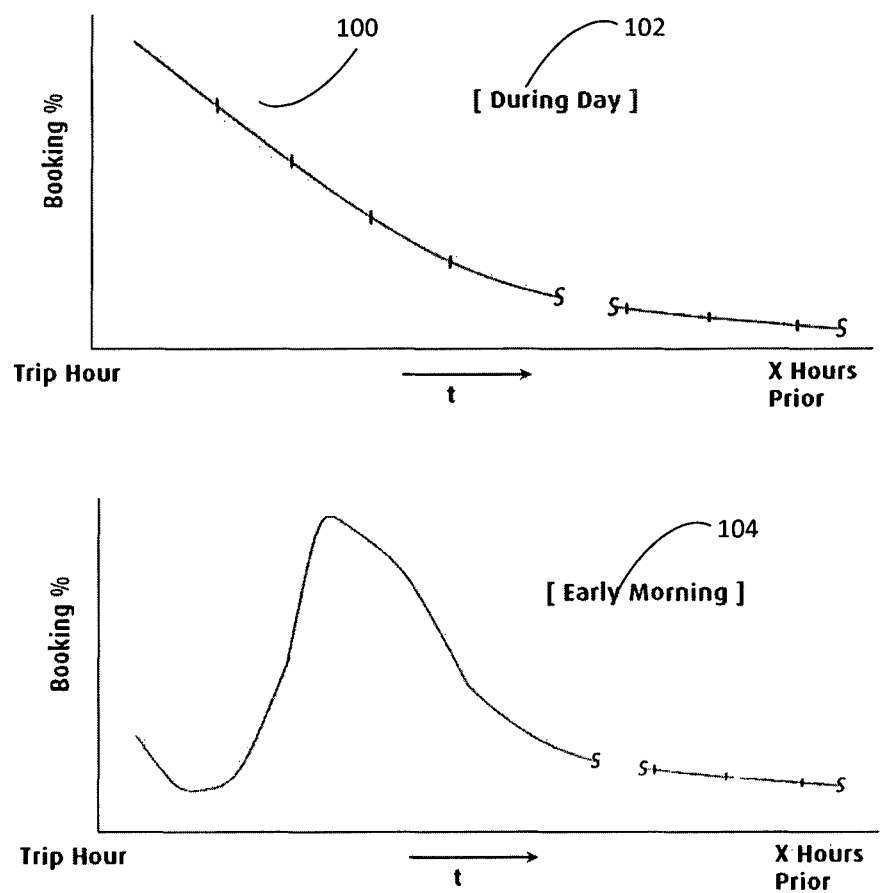
FIG. 1 illustrates a graph, showing the booking pattern of a cab in accordance with the present disclosure.

The present disclosure relates to a system and associated method to determine the expected demand and consequential availability of taxi/cab in future through a forecasting technique. Further the disclosure enables an apparatus to display cab availability in real-time for forward reservation of cab, which is explained below with reference to the accompanying drawings in accordance with an embodiment of the present disclosure.

According to an embodiment of the present disclosure a system for forward reservation is disclosed. A customer invokes an application embedded in mobile/portable device to make a forward reservation for a time. First, either a pick-up location is selected from the map or is directly typed into the application. If the map is used to select the pick-up location, the latitude and longitude are identified and reverse geocoded to configure the area and zone to which the pickup is mapped. The customer may then be prompted to enter a drop, location. When the customer selects to proceed, the system for the selected pick up location sends the availability for the next defined days. The moment the customer changes the date and time the availability of cab is dynamically changed to reflect new information as per the changes made. In case the cab is unavailable, customer can alter the time to get the cab availability. Once the customer confirms the booking, the system sends an acceptance message and said booking resides in the system. Also the available bookings for the zone at particular hour are reduced by 1. In case borrowing is used it will be reduced form the zone borrowed.

At a predefined time prior to the pickup time depending on plurality of factors such as geography of the region, cabs available on road, etc. the said booking is brought up in the system for-delivery. As a first step the closest free cabs within a distance (can be defined by radial/driving distance/time) are selected. According to another embodiment the system may also identify cabs which will become free within the next few minutes. This is identified on the basis of drop location provided by a first user.

According to an embodiment the present disclosure enables efficient booking of cabs for forward reservation, i.e. booking a cab before scheduled departure from a pickup location. In an exemplary embodiment first step may be to collect data or asset based on cab location and status in a city. The data collection may be done for pre-defined past days for e.g. say over the last "j" days. The data is collected and then split into say "k" slots of an hour to ensure that at least one (1) status of the "k" slots for the hour is available. If the cab was found to be free in any one or more of the "k" slots, it may be counted as a free vehicle for that specific "k" slot. Further, according to another embodiment cabs that are located in a particular geography from where it is not feasible to borrowing are excluded from the count, for example free cabs at airport or station or a distant business district or residential complex. The data collected can also include speed, or direction.

According to present disclosure Holt Winters method may be used for forecast analysis on the past data collected. The forecast analysis may enable to predict the number of free cabs available in the near future. The prediction could be done hour-wise for a specific geography.

Holt-Winters (HW) method used for forecast analysis is a double exponential smoothing method and provides short to medium-range forecasting. This procedure can be used when both, trend and seasonality are present, HW method enables dynamic estimates for three components: level, trend, and seasonal.

The Holt winters method may be used as below:
Firstly, the 'level' is calculated—

$L_t = \alpha(Y_t - S_{t-p}) + (1-\alpha)[L_{t-1} + T_{t-1}]$

Secondly, the 'trend' is estimated—

$T_t = \gamma(L_t - L_{t-1}) + (1-\gamma)T_{t-1}$

Then, the 'seasonality' is computed—

$S_t = \delta(Y_t - L_t) + (1-\delta)S_{t-p}$

Then, $Y\hat{}_t = L_{t-1} + T_{t-1} + S_{t-p}$

Where,
$L_t$ is the level at time t, $\alpha$ is the weight for the level
$T_t$ is the trend at time t, $\gamma$ is the weight for the trend
$S_t$ is the seasonal component at time t, $\delta$ is the weight for the seasonal component
p is the seasonal period
$Y_t$ is the data value at time t
$Y\hat{}_t$ is the forecasted free cabs, or one-period-ahead forecast of free cabs, at time t Further, according to present disclosure the number of cabs may be forecasted using regression to bring in the impact of real time changes for a particular time, say "x" hours prior to the pick-up time. The regression method may be implemented on data collected for the T days, and for the time k1, k2, k3 hours prior to the pick-up time using the least squares method described herein below.

Each predictor in a regression equation has an estimated coefficient associated with the population regression coefficients, $\beta_k$. Use the estimated coefficients ($b_k$) with the predictors to calculate the fitted value of the response.

The formula for the coefficient or slope in simple linear regression is:

$$b_1 = \frac{\sum (x_i - x_a)(y_i - y_a)}{\sum (x_i - x_a)^2}$$

The formula for the intercept $b_0$ is $b_0 = y_a - b_1(x_a)$

In matrix terms, the vector f coefficients in multiple regressions is calculated by the formula:

$\beta = (x'x)^{-1}x'y$

Where,
$y_i = i^{th}$ observed free cabs at t hours
$y_a$ = mean response of free cabs at t hours
$x_i = i^{th}$ free cab count at t-x hours
$x_a$ = mean value free cabs at t-x hours
x = predictor matrix of free cabs at t-x hours
y = response matrix of free cabs at t hours
x' = transpose of 'x'

This step may be used at 1 to 3 interval levels on the basis of the strength of correlation and adjustment to the output.

Once a free cab count (FC) is received after Holt Winters and regression methods it is corrected for driver willingness and traffic conditions basis factors such as bid ratio, self and current business proportions. According to exemplary embodiment of the present disclosure the bid ratio (BR) may be calculated as bids accepted for the hour against bids sent for the hour. Further, self and current business proportion (SC) may be considered as ratio of self and current trips for the hour with total trips for the hour.

Further, according to the embodiment booking acceptable in advance for the cab maybe derived from the equation described below:

$BA_t = FC \times BR \times (1-SC) \times R_f$ where $BA_t$ is Bookings Acceptable in advance for the hour. And $R_f$ is a risk factor. Further the derived value of bookings acceptable may be mapped to geographical zones/pre-defined zone as mentioned in section above.

Figure 2:
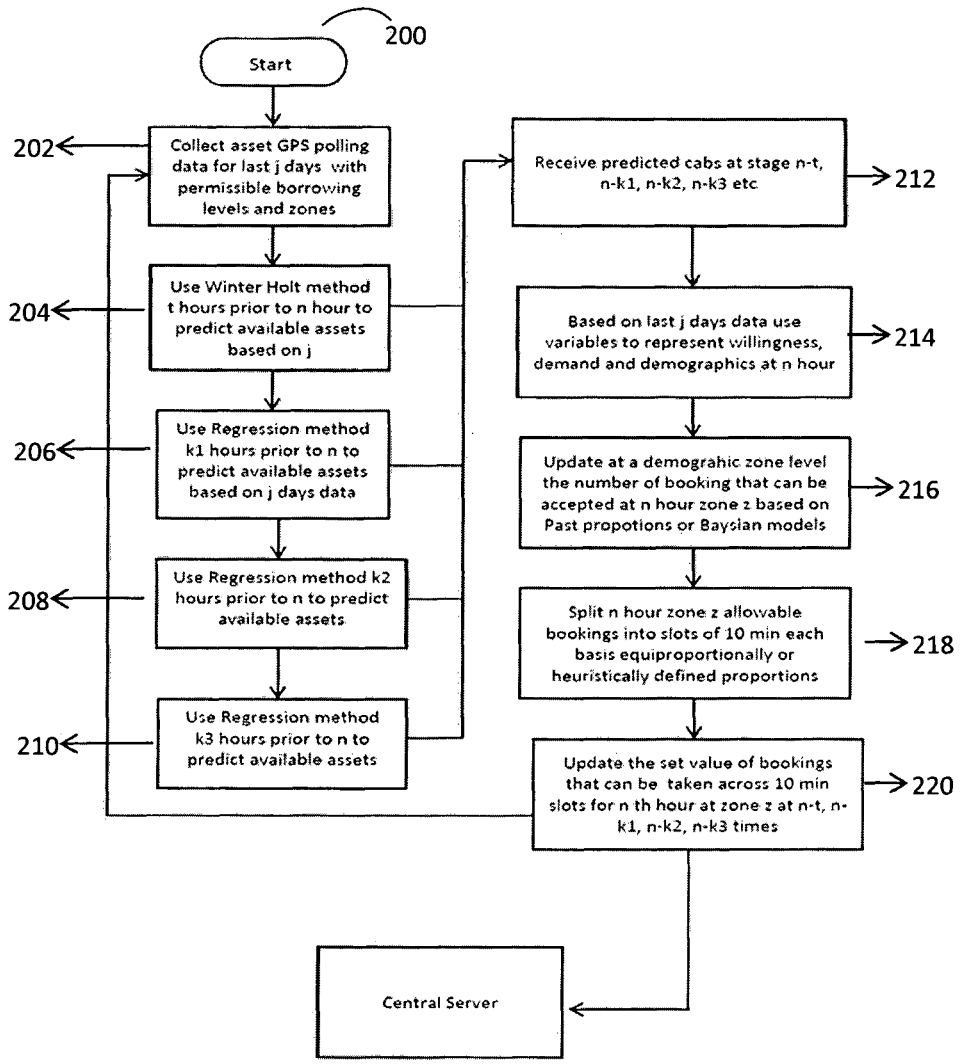
FIG. 2 illustrates a block diagram for forecast analysis, in accordance to an embodiment.

FIG. 1 illustrates a graph, showing the booking pattern of a cab. According to the graph 100, there emerges a very distinct pattern in forward reservation of the cab. According to 102, during a day, user/customer usually books cab in shortly to prior to his scheduled departure time. Therefore during the day there is an exponential decline in forward reservation of the cab, i.e. very few user make forward reservation for the cab well in advanced. It can also be said that large number of bookings are made only a little time before the actual delivery. However, during morning 104, there is a completely distinct pattern. During early morning scheduled departure time/scheduled pick up time, the user makes the forward reservation of the cab well in advance. This can be observed from the bell curve, wherein the forward reservation reaches a peak, approximately 6-10 hours before the actual delivery, then transcends to a low. FIG. 2, illustrates a block diagram for forecast analysis 200, in accordance to an embodiment. The forecast analysis 200 may be performed in a forecast module. The forecast module may be hosted on a central server or in a cloud computing environment. The forecast analysis 200 may be performed using standard models for forecast analysis like Holt-Winters method, and/or regression method. Holt-Winters or HW method is an exponential-smoothing procedure used to forecast about activities like sales or demands in future. It is, generally, used when the data contain a trend and a seasonal pattern. Exponential smoothing is an adjustment technique which takes the previous period's forecast, and adjusts it up or down based on what actually occurred in that period. It accomplishes this by calculating a weighted average of the two values. It also has the advantage of being able to adapt to changes in trends and seasonal patterns in demand when they occur. This means that slowdowns or speed-ups in demand, or changing consumer behaviour can all be accommodated. It achieves this by updating its estimates of these patterns as soon as each new relevant figure arrives.

The forecast analysis 200 may capture a historical data, at block 202, pertaining to each cab from a plurality of cabs. The historical data captured can be captured for pre-defined parameters like location for each of the cabs, time of scheduled pickup, time of scheduled drop, a pickup location, a drop location, and/or a scheduled date. A location module communicably connected to the forecast module may enable the capturing of location for the historical data. Further at block 204, the model for forecast analysis may be applied for defined values and a first intermediate data is derived. Further at blocks 206, 208 and 210 iteratively applying the regression method for forecast analysis, and deriving second intermediate data, third intermediate data and fourth intermediate data at blocks 206, 208 and 210 respectively. Further, at block 212, a predicated data set is generated. At block 214, for a pre-defined set of the historical data, information pertaining to willingness, demand and demographics is retrieved. Further at block 216, the predicated data may be distributed across various pre-defined zone. The data distribution for the pre-defined zone can be based on past proportions or Bayesian model. Further, at block 218, the predicated data for pre-defined zone can be further split/segregated into smaller intervals based on equal proportions or heuristically defined proportions. At block 220, a current data and the predicated data is mapped to derive a second data set. The second data set is updated dynamically and may be rendered on a portable device with an application.

The above discussed block diagram can be illustrated with an example as follows, however: Initially location data for each cab using a GPS may be retrieved for say "j" days. While retrieving the location data, the permissible borrowing level may also be captured. Further, using Holt Winters method forecast analysis may be made to predict availability of cabs for forward reservation for say "t" hours prior to "n" hours, where "n" hours may represent scheduled departure time. Further, using a regression method for three separate or unique values may be say "k1", "k2", and "k3". Further the cabs can be dynamically forecasted for future reservation by computing availability of cab at (n–t), (n–k1), (n–k2), (n–k3) and so on. Further, while collecting location data for the "j" days of the cab, certain other information may also be captured like willingness of cab to respond a pickup request, and/or the location during "n" hour. Further each geographical location can be segregated into smaller pre-defined zones "z", wherein according the forecast analysis the availability of cabs at time "n" in pre-defined zone "z" can be predicated and distributed based on past proportions or Bayesian models. Further the time can split into smaller interval for each pre-defined zone using equal proportions or heuristically defined proportions. Further, based on the predicated data and current data a second data set is generated. Wherein, the second data set is updated real-time and maybe hosted on a central server.

Figure 3:
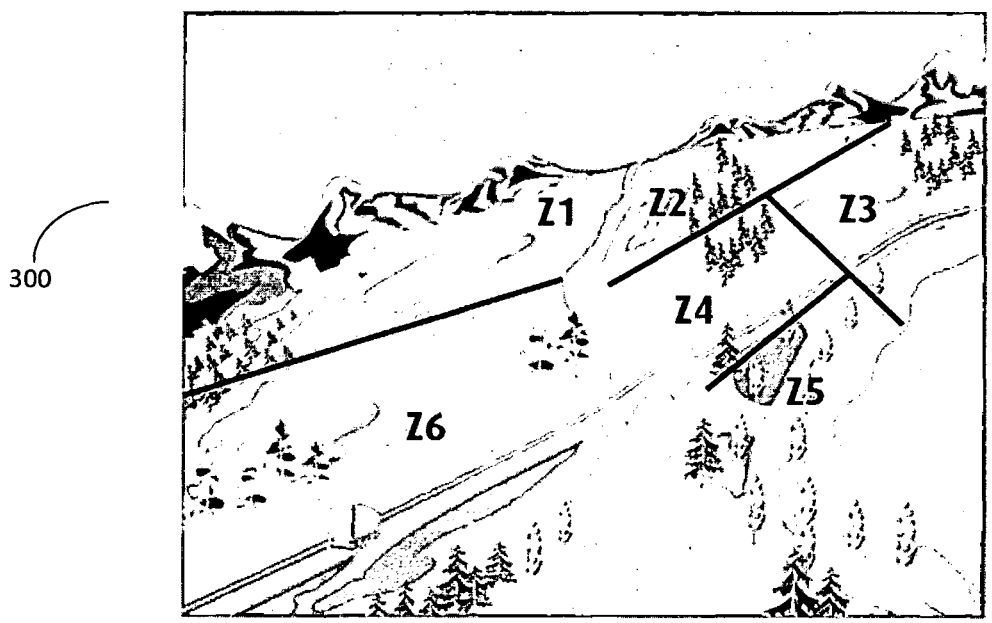
FIG. 3 illustrates division of city or a large area in accordance to the present disclosure.

Now referring to FIG. 3, illustrates an exemplary pre-defined zone, in accordance with an embodiment. The pre-defined zone 300 illustrates a geographical location. The geographical location may further be segregated into a plurality of pre-defined zones of smaller area. Segregating into plurality of pre-defined smaller zones may enable capturing data for cab more accurately. Further, the plurality of pre-defined zones may act as a borrowing zone, wherein each of the pre-defined zones from the plurality of pre-defined zone may share cabs between among themselves as and when the demand arise.

FIG. 3 illustrates division of city or a large area in accordance to the present disclosure. According to the embodiment a geographical location 300, may be segregated into smaller pre-defined zones. The segregation into pre-defined zones may depend plurality of factors such as geographical limitations and man-made barriers such as tracks, canals, etc. or business supply and demand situations. Further, these pre-defined zones may act as a borrowing zone for one or more neighbouring zones to make a cab available for forward reservation.

Figure 4:
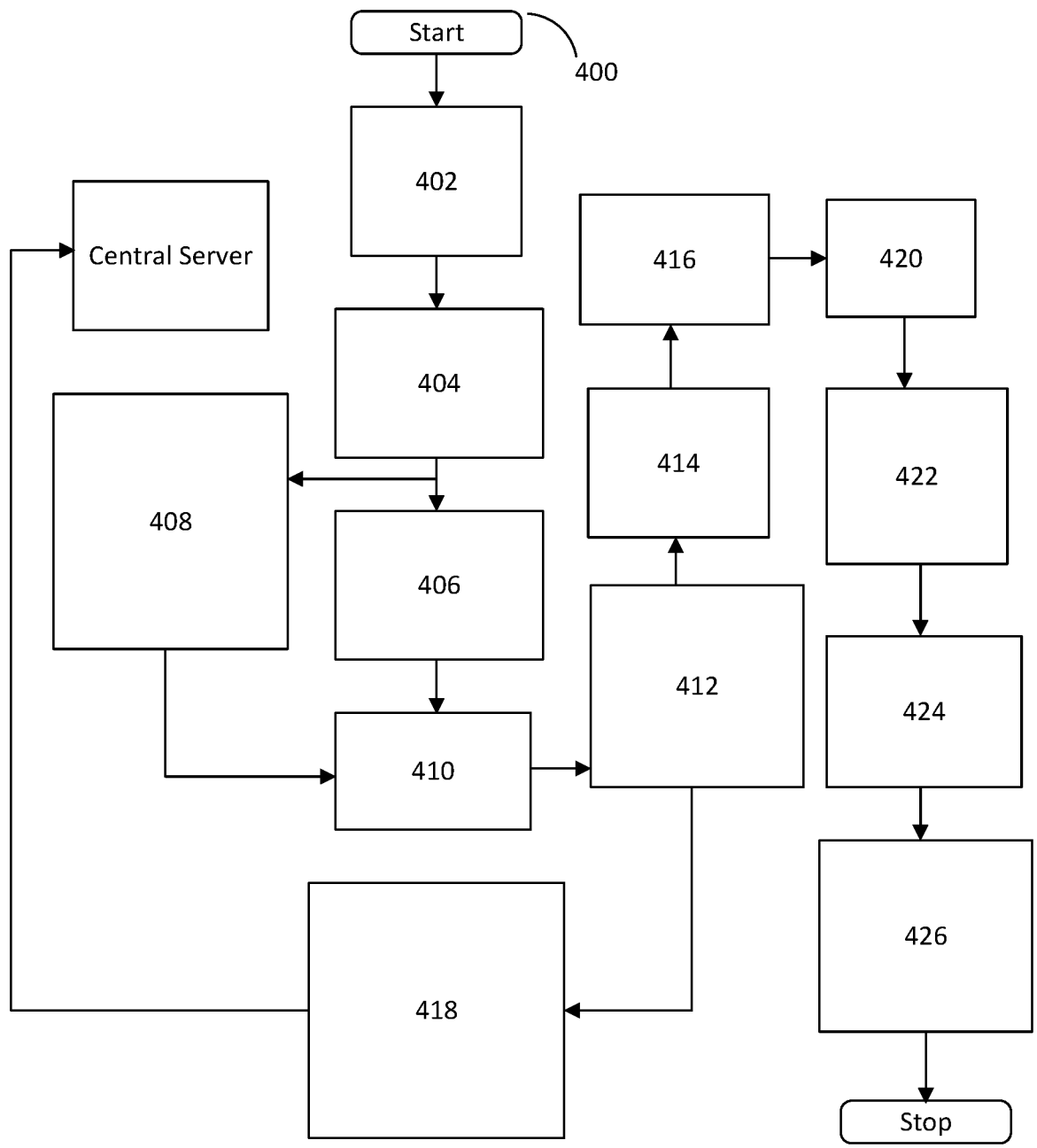
FIG. 4 illustrates a flowchart illustrating a method for forward reservation of a cab, according to present disclosure.

Referring FIG. 4, illustrates a flowchart illustrating a method for forward reservation of a cab. The flowchart 400, starts at step 402, wherein a customer may invoke an application embedded in a portable device. In following steps of 404, and 406 the costumer may provide inputs for a first data set. The first data set may capture information pertaining to a pick up location, a drop location, a scheduled time, and/or a scheduled date. In an exemplary embodiment the pickup location and drop location may be selected directly from a map rendered by the application on the portable device. Upon capturing the first data set, the first data set is simultaneously received by a central server at step 408. The first data set is mapped with a second data set at step 408. The second data is retrieved from the central server. Upon mapping the first data set with the second data set, a third data set is generated and then may be transmitted through a communication means to the portable device at step 410 and is displayed to the customer. Further, at step 412, the cab availability data from a borrowing zone may also be displayed. At step 414, the customer may review the third data set and may choose to confirm reservation. Upon confirmation; a confirmation message is transmitted to the central server at step 416. Simultaneously, the third data set is updated in the central server at step 418. According to an embodiment at step 420, at a pre-defined interval before the scheduled time, a cab closest to the pickup location would be located. If in case there is no free cab available, the system would search for the cab "soon to be free" or would initiate a bid process at step 422. At step 424 a winning bid is selected from a plurality of bids received during the bid process. The winning bid may be selected based on at least one of the information captured pertaining to availability of the cab, or last reservation, or distance between the cab and the pickup location. The forward reservation may then be assigned to the cab with winning bid. Further at step 426 a first set of information may be transmitted to the portable device, wherein the first set of information may comprise contact details of the cab.

Working Example

Figure 5:
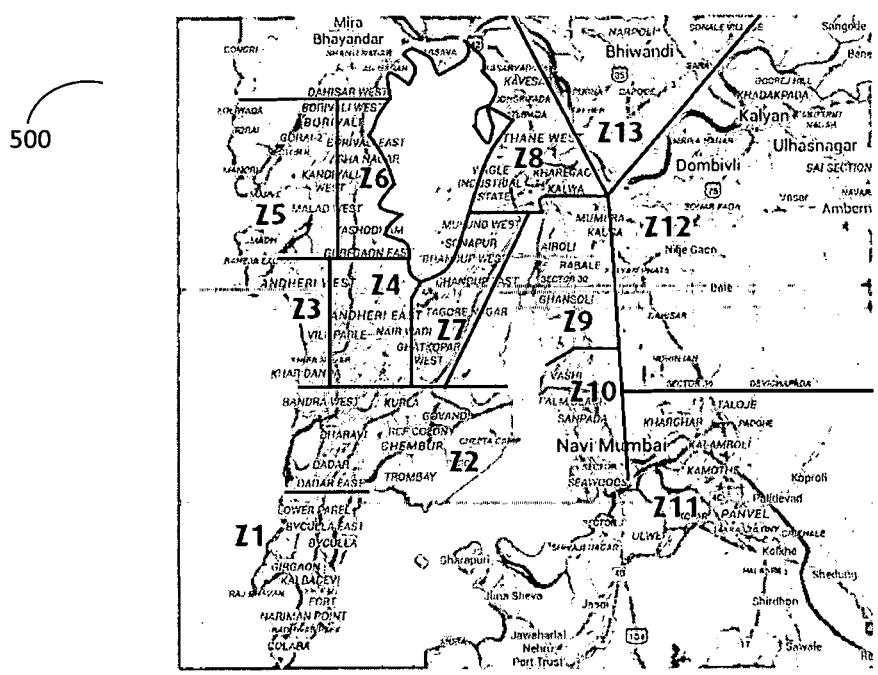
FIG. 5 illustrates a working example of the present disclosure.

FIG. 5, illustrates a working example of the present disclosure. The example uses Mumbai as a geographical location segregated into smaller pre-defined locations Z1, Z2, Z3, Z4, Z5, Z6, Z7, Z8, Z9, Z10, Z11, Z12, and Z13. The data of trips done for the relevant hour is collected for last k days and then the proportion of trips for each zone is computed as:

$$BA_{zt} = \text{Advanced trips completed in last } k \text{ days from zone } z * BA_{zt}/\text{Total Advanced trips in last } k \text{ days}$$

Thus for each zone z the number of advance booking that can be accepted is calculated and set into the system. Thus for an hour the quota is set. This is then split to 10 min level at a heuristically set percentage or at a percentage of trip ends. Let's assume in Z1 at h hour, the number of booking that can be taken is only 30 then this could be divided into 7, 5, 4, 6, 4, and 4. This is based on a premise that a customer being offered a cab 10 min prior or later is likely to accept the booking than wait for that moment to book the cab. Also this ensures that the load across the call centre is balanced and the time spent for waiting for a customer by the driver is completely prevented.

A heuristically defined value at which a neighbouring zone which has crossed the number of bookings assigned can borrow from the neighbour only if the neighbour has not exhausted them. Whenever the number of cabs for a particular zone is 0 if there is availability in a neighbouring zone it is considered and offered to the quantum available.

Z1 can borrow from Z2 to the order of 30% and Z2 can lend 80% of its value. If Z1 value computed by the above process was 30 for hour h while that for Z2 for the same hour was 38. If Z1 was completely utilised while for Z2, 20 booking were taken then borrowing would be computed as below:

Z1 Limit 30 (b)
Z1 Utilisation 30
Z1 Balance 0
Z2 Limit 38
Z2 Utilisation 20
Z2 Balance 18
Borrowing from Z2 (a) 30%

$$\text{Allowable Borrowing} = a \times b = 30\% \times 30 = 9$$

So Z1 can borrow 9 booking from 38 of Z2 if total borrowing from Z2 does not exceed 80% of Z2 which is 30. Similarly other zones may borrow from Z2 and Z1 and vice versa.

We claim:

1. A method for forward reservation of a cab, the method comprising:
   receiving, a first data set by a data module in a central server, from a portable device in communication with the central server, wherein the first data set comprises a pick up location, a drop location, a scheduled time and a scheduled date;
   mapping, by the data module in the central server, the first data set with a second data set, wherein the second data set is based on a predicted data and a current data, wherein the predicted data is provided by a forecast module;
   transmitting, by the data module in the central server, a third data set to the portable device, wherein the third data set is based on the mapping of the first data set and the second data set;
   receiving, at the central server, a confirmation message for the forward reservation of the cab from the portable device;
   segregating a geographical region of a cab into a pre-defined zone and a borrowing zone by a location module in the central server;
   retrieving, by the central server, a cab availability data from at least one of the pre-defined zone and the borrowing zone;
   assigning, by the central server, the forward reservation to the cab selected from at least one winning bid, or available in the at least one of the predefined zone and the borrowing zone; and
   transmitting, by the central server, a first set of information to the portable device, wherein the first set of information comprises contact details of the cab.

2. The method of claim 1, further comprising generating, by the forecast module, the second data set comprising the predicted data and the current data by:
   capturing a historical data for pre-defined parameters;
   applying a forecast analysis using the forecast module to the historical data; deriving the predicted data; and
   capturing the current data of a plurality of cabs from a mobile data terminal embedded in each of the plurality of cabs.

3. The method of claim 1, further comprising capturing, by a bidding module in the central server, a plurality of bids, wherein capturing the plurality of bids comprises:
   initiating a bid process for the forward reservation at a pre-defined interval before the scheduled time received in the first data set;
   retrieving the current data;
   capturing at least one information pertaining to one or more of availability of the cab, last reservation, distance between the cab and the pickup location, and soon to be free information from one or more drivers in close proximity; and
   selecting a winning bid from the plurality of bids.

4. A system for forward reservation of a cab, the system comprising:
   a portable device comprising an embedded application, wherein the application is configured to capture a first data set, wherein the first data set comprises a pick up location, a drop location, and a scheduled date;
   a mobile data terminal mounted on each cab from a plurality of cabs; and
   a central server comprising a forecast module, a data module, a bidding module, and a location module, wherein the central server is configured to:
   receive, by the data module, the first data set from the portable device, map, by the data module, the first data set with a second data set, wherein the second data set is based on a predicted data and a current data, wherein the predicted data is provided by the forecast module;

transmit, by the data module, a third data set to the portable device, wherein the third data set is based on the mapping of the first data set and the second data set;

receive a confirmation message for the forward reservation of the cab from the portable device;

segregate, by the location module, a geographical region of a cab into a predefined zone and a borrowing zone;

retrieve a cab availability data from at least one of the pre-defined zone and the borrowing zone;

assign the forward reservation to the cab selected from at least one winning bid, or available in the at least one of the predefined zone and the borrowing zone; and transmit a first set of information to the portable device, wherein the first set of information comprises contact details of the cab.

5. The system of claim 4, wherein the pickup location and the drop location is selected using at least one of selecting from a map rendered on the portable device and text input.

6. The system of claim 4, wherein the mobile data terminal comprises a communication module configured to communicate with the central server.

7. The system of claim 6, wherein the communication module communicates current data to the central server, wherein the current data pertain to at least one of availability of the cab, last reservation, and distance between the cab and the pickup location.

8. The system of claim 4, wherein the mobile data terminal further comprises a location module, configured to capture a current location of the cab.

9. The system of claim 4, wherein the predicted data is based on historical data.

10. The system of claim 9, wherein the historical data is stored and retrieved from the data module.

11. The system of claim 4, wherein the bidding module is configured to initiate a bidding process and select a winning bid.

12. The system of claim 4, wherein a location of the cab is further mapped to the pre-defined zone.

\* \* \* \* \*